United States Patent [19]

Ueda

[11] Patent Number: 4,464,255

[45] Date of Patent: Aug. 7, 1984

[54] WATER PURIFICATION DEVICE

[75] Inventor: Yoshihiko Ueda, Yamaguchi, Japan

[73] Assignee: Takara Kogyo Co., Ltd., Tokyo, Japan

[21] Appl. No.: 471,162

[22] Filed: Mar. 1, 1983

[30] Foreign Application Priority Data

Jul. 27, 1982 [JP] Japan ................... 57-129661

[51] Int. Cl.³ .............................................. B01D 23/10
[52] U.S. Cl. ..................................... 210/136; 210/274; 210/279; 210/285; 210/289
[58] Field of Search ........ 210/279, 285, 286, 274–278, 210/289, 291, 136

[56] References Cited

U.S. PATENT DOCUMENTS 3,685,657  8/1972  Hunter et al. ................... 210/289
3,698,554  10/1972  Mail ................................... 210/274

FOREIGN PATENT DOCUMENTS 386933  9/1922  Fed. Rep. of Germany ...... 210/285

Primary Examiner—Ivars C. Cintins
Attorney, Agent, or Firm—Wenderoth, Lind & Ponack

[57] ABSTRACT

A water purification device comprises a raw water channel forming plate extending spirally along the inner wall of a filter tank. A collector for collecting filtered water, positioned in the layer of the filter medium substantially at the center of the raw water channel forming plate, is also disclosed. Since the raw water is filtered from the periphery of the layer of the filter medium and the continuous raw water channel formed by the spirally extending raw water channel forming plate enables the number of influx points of raw water into the raw water channel to be reduced to one at a minimum, the structure is simplified and manufacture costs are reduced.

15 Claims, 4 Drawing Figures

WATER PURIFICATION DEVICE

BACKGROUND OF THE INVENTION

1. Field of the Invention

This invention relates to a water purification device in which raw water may be purified by filtration from the periphery of the filter medium layer and more particularly to such device in which a continuous raw water channel may be provided by a raw water channel forming plate extending spirally on the inner wall of the filter tank.

2. Description of the Prior Art

A water purification device in which a plurality of raw water channel forming plates are mounted in tiers along the inner wall of the filter tank, and in which a collector for collecting filtered water is mounted substantially at the center of the filter medium layer for purifying raw water by filtration from the periphery of the filter medium layer, has already been proposed in our copending Japanese Patent Application No. 39092/1982.

Since raw water is filtered from the periphery of the filter medium layer, it is possible to make the best use of the filter medium at the peripheral zone for improving the filtration efficiency.

However, since the channel forming plates are mounted in tiers, raw water inlet points such as raw water distribution ports need be provided for each channel forming plate.

SUMMARY AND OBJECT OF THE INVENTION

It is therefore an object of the present invention to provide a water purification device in which raw water distribution ports need not be provided to each channel forming plate, and in which filtration of raw water from the periphery of the filter medium may be effected by only a few of raw water distribution ports or occasionally without the necessity of providing special raw water distribution ports at all.

BRIEF DESCRIPTION OF THE DRAWINGS

The present invention will now be described by referring to the accompanying drawings, in which.

DETAILED DESCRIPTION OF PREFERRED EMBODIMENTS

Figure 1:
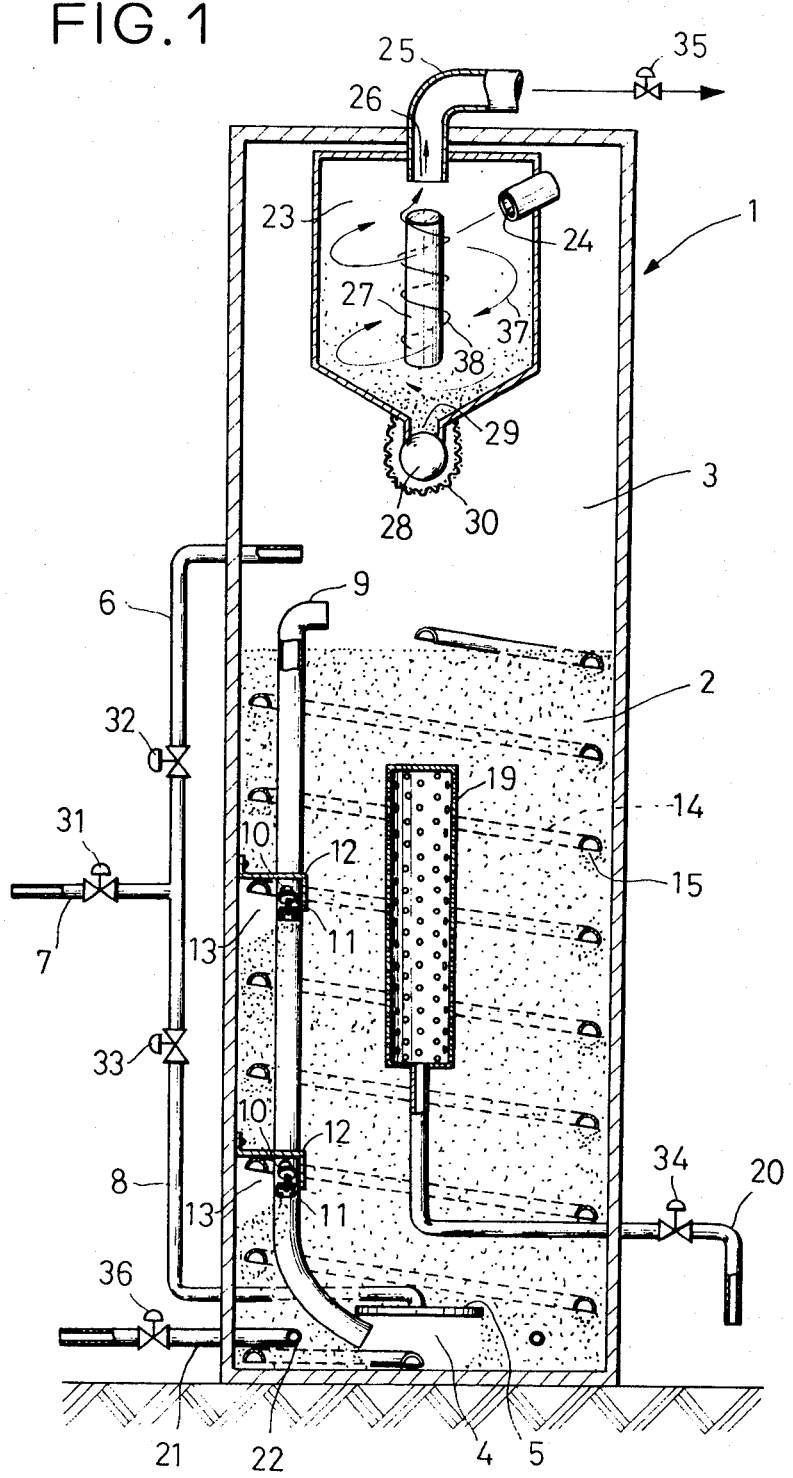
FIG. 1 is a vertical section of a first embodiment of a purification device according to the present invention.
Figure 2:
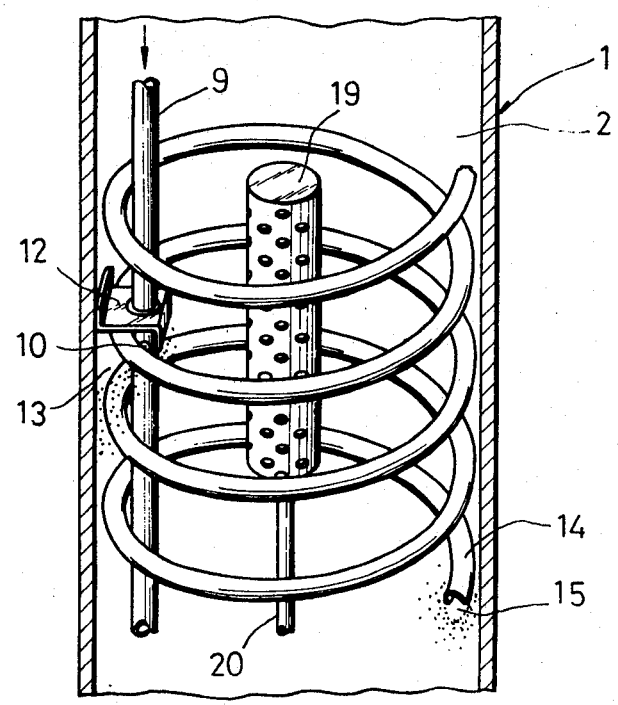
FIG. 2 is a partial perspective view showing essential parts of the purification device shown in FIG. 1.
Figure 3:
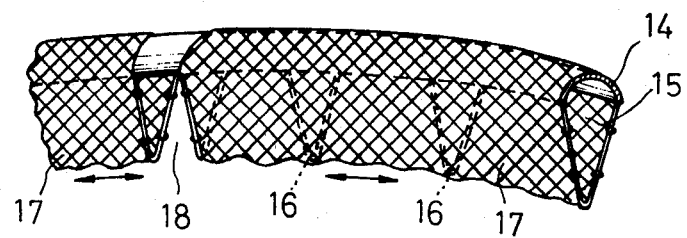
FIG. 3 is a partial enlarged perspective view showing a modification of the raw water channel forming plate.

FIGS. 1 to 3 illustrate a first embodiment of the present invention.

In the drawings, the numeral 1 designates a filter tank in which granular filter medium is heaped for forming a filter layer 2 adapted for purification of raw water.

As an example, a sand consisting of a mixture of coarse and fine sands is used as such granular filter medium.

In the drawing, the numeral 3 designates a first raw water chamber, and the numeral 4 a second raw water chamber defined by a raw water channel forming plate 5. The numeral 6 designates a first raw water supply pipe branched upwardly from a main raw water supply pipe 7 and communicating with the first chamber 3. The numeral 8 designates a second raw water supply pipe branched downwardly from the main supply pipe 7 and communicating with the second raw water chamber 4.

Raw water is supplied through these first and second supply pipes 6, 8 into the first and second crude water chambers 3, 4, respectively.

In the drawing, the numeral 9 designates a raw water distribution pipe mounted to one side of the filter layer 2.

This distribution pipe 9 has its upper and lower ends opened into the first and second crude water chambers 3, 4, respectively.

The pipe 9 has a small number of raw water distribution ports 10 along its length, and a check valve 11 is mounted to each of these distribution ports 10 to prevent backflow of the granular filter material.

A suitable number of raw water distribution plates 12, each having an L-shaped cross section, are mounted directly above these distribution ports 10.

The pressure of raw water flowing through these ports 10 into the filter layer 2 acts to displace the granular filter medium from near the distribution plates 12 so that a raw water distribution chamber 13 consisting of a space with an angle of rest is formed below each distribution plate 12. The plate 12 also acts for supporting the distribution pipe 9 on the inner wall of the filter tank 1.

The numeral 14 designates a raw water channel forming curved plate which extends spirally along the inner wall of the filter tank 1 and which passes in the spiral path thereof through these raw water distribution chambers 13. Raw water flows through these distribution chambers 13 into a smoothly continuous raw water channel 15 defined by the interior of the channel forming plate 14.

The forming plate 14 has its upper and lower ends opened into the first and second raw water chambers 3, 4 so that raw water also flows into the channel 15 by way of these upper and lower open ends of the plate 14.

In the present embodiment, the plate 14 has the shape of a regular helix such that the interval or pitch between adjoining turns is constant. However, the helix may be irregular so that the interval or pitch is not constant. Alternatively, if the plate 14 has the shape of a regular helix, that portion of the plate 14 which is to be disposed in an upper position may be disposed in a lower position. It should be understood that these modifications are also included within the present invention.

In the embodiment shown in the drawings, the plate 14 has an inverted U-shaped cross-section and the shape of a circular helix. However, the plate 14 may also have a flattened or chevron-shaped cross-section and the shape of a square helix.

The continuous raw water channel 15 need not be defined by the continuous channel forming plate 14, but by two or more channel forming plates connected end to end with one another. FIG. 3 shows a modified raw water channel forming plate 14.

The plate 14 shown in FIG. 3 has a number of slide elements 16 formed of wire pieces, and a filter net 17 slidably disposed about these slide elements 16 and formed of nylon in the shape of a pouch, in order to increase the cross-sectional area of the channel 15 and increase the area of filtration.

During washing of the layer of the filter medium, to be described later, a sliding contact may take place between the filter medium and the outer surface of the filter net 17 and between the slide elements 16 and the inner surface of the filter net 17 due to movement of the filter medium and the accompanying movement of the filter net 17 itself, resulting in the washing of the inner and outer surfaces of the filter net 17.

In cases where the channel forming plate 14 is covered with such filter net 17, the net 17 is interrupted at predetermined locations 18 so that coarse size materials intruding into the raw water channel 15 within the filter net 17 may be discharged through these locations 18.

Reference is again made to FIG. 1.

In FIG. 1, the numeral 19 designates a filtered water collector mounted substantially centrally of the channel forming plate 14.

The collector 19 is designed as a vertical perforated water collection tube connected to a filtered water tube 20 extending out of the filter tank 1.

In FIG. 1, the numeral 21 designates an air supply pipe to be used for washing the layer of the filter medium.

The air supply pipe 21 is connected to an annular air ejection pipe 22 mounted in the lower portion of the layer 2 of the filter medium.

The air ejection pipe 21 is used for ejecting the air supplied from the air supply pipe 21 into the bottom of the layer 2 and thereby washing the layer 2 of filter medium.

The numeral 23 in FIG. 1 designates a separation chamber to be used during washing of the layer 2 of the filter medium.

This separation chamber 23 is arranged within the first raw water chamber 3 and is designed to prevent outflow of the granular filter medium that may be entrained in the contaminated washing water. The separation chamber 23 has an inlet port 24 through which contaminated washing water contained in the first raw water chamber 3 is made to flow into the separation chamber 23 as a spiral water flow descending gradually along the inner wall, and an outlet port 26 corresponding to the inlet port 24 and communicating with the outside of the tank 1 through a contaminated washing water discharge pipe 25. The separation chamber 23 also has a bar 27 of a desired thickness suspendedly mounted substantially centrally of the chamber 23 and causing a flow of water inverted from the spiral water flow to rise in gyration along its peripheral wall and to be finally discharged through the outlet port 26. An outlet 29 for the granular filter medium is mounted at a hopper-like bottom of the separation chamber 23 and is designed to be opened and closed by a valve 28.

The valve 23 in the separation chamber 28 is formed as a spherical float valve urged by buoyancy in the valve opening direction and protected from loss by an enclosing mesh basket 30.

The numeral 31 designates a first valve mounted in the main raw water supply pipe 7 the numeral 32, a second valve mounted in the first raw water supply pipe 7 the numeral 33, a third valve mounted in the second raw water supply pipe 8 the numeral 34, a fourth valve mounted in the filtered water pipe 20 the numeral 35, a fifth valve mounted in the contaminated washing water discharge pipe 25; and the numeral 36, a sixth valve mounted in the air supply pipe 21.

First of all, the operation of filtering the raw water will be now described.

With the first valve 31, second valve 32, third valve 33, and the fourth valve 34 opened and the fifth valve 35 and the sixth valve 36 closed, raw water is allowed to flow from the first supply pipe 7 into the first chamber 3 and the second chamber 4 through the main supply pipe 6 and the second supply pipe 8, respectively.

The second raw water chamber 4 is defined at this time by displacement of the granular filter medium from near the lower opening of the second supply pipe 8 under the pressure of the water flowing therethrough into the layer 2 of the filter medium, thereby forming a free amorphous space below the raw water chamber forming plate 5. The raw water which has entered the first and second raw water chambers 3, 4 permeates into the layer 2 from above and below and is directed towards collector 19 after being filtered at the upper and lower portions of the filter layer 2. In addition, the raw water which has flown into the first and second raw water chambers 3, 4 flows into channel 15 at the upper and lower open ends of the raw water channel forming plate 14 to permeate towards the collector 19 from the channel 15 and to be purified by filtration peripherally of the layer 2.

Similarly, the raw water which has flowed into the first raw water chamber 3 flows into the distribution pipe 9 at the upper open end thereof and thence into the channel 15 of the plate 14 through the distribution port 10 and also into the distribution chamber 13 to permeate from the channel 15 towards collector 19 to be purified by filtration peripherally of the layer 2. Finally, part of the raw water which has flowed into the distribution pipe 9 flows from the lower open end thereof into the second raw water chamber 4 and is purified by filtration while being directed towards collector 15.

The water thus purified by filtration vertically and peripherally of the filter layer 2 is allowed to flow to the outside through collector 10 and the discharge tube 20. Filtration of raw water peripherally of the filter layer 2, in addition to filtration vertically thereof, results in increased filtration area and increased efficiency of the filter layer 2 with a resulting increase in the filtration speed, capacity, and efficiency.

The washing operation for the filter layer 2 will be now described.

With the first valve 31, third valve 33, fifth valve 35, and the sixth valve 36 opened and the second and fourth valves 32, 34 closed, raw water is supplied as washing water from the second supply pipe 8 to the bottom of the filter layer 2, at the same time that air is supplied from ejection pipe 22 to the bottom of the layer 2.

At this time, a part of the air ejected from the ejection pipe 22 flows into the channel forming plate 14 and floats spirally upwardly along the lower surface of the plate 14. By such spiral upward floating movement of the air, the washing water adjacent to the plate 14 and the filter medium are stirred up. Thereby, the washing of the filter layer 2 adjacent to the plate 14, which is easily contaminated, is carried out.

The filter medium layer 2 is cleaned by such countercurrent washing with the air and washing water.

At this time, part of the granular filter medium is entrained in the contaminated washing water in the chamber 3 and flows through inlet port 24 into separation chamber 23.

The contaminated washing water thus flowing into the separation chamber 23 descends as a spiral flow or stream 37 down the inner wall of the chamber 23.

At this time, the granular filter medium entrained in the washing water is separated therefrom centrifugally and descends spirally on the inner wall to be precipitated on the bottom of the separation chamber 23.

During such washing, the valve 28 closes the outlet 29 of the granular medium through boyancy.

The washing water which has descended in this manner and reached the bottom is reversed in direction and turned into a rising gyratory flow or stream 38 which is routed through the outlet port 26 and discharged finally through discharge pipe 25.

Since the bar 27 has the design thickness, the stream 38 has a diameter of gyration larger than the thickness of the bar 27.

Since the centrifugal force related to the diameter of gyration is acting on the stream 38, a part of the granular filter medium precipitated on the bottom of the separator chamber 23 and occasionally entrained in the stream 38 is centrifuged, transferred to the spiral stream 37, precipitated, and heaped on the bottom.

In this manner, the granular filter medium entrained in the washing water may be prevented from flowing out through outlet port 26.

Such conjoint washing with both air and water is to be followed by finishing washing only with washing water.

When the granular filter medium which has precipitated and heaped on the bottom of the separation chamber 23 has reached a certain weight, the valve 28 is forced open against its buoyancy to return the granular filter medium into the filter layer 2 through outlet 29.

The air which has been used in the conjoint washing is discharged through the port 26 and discharge pipe 25 along with washing water.

Figure 4:
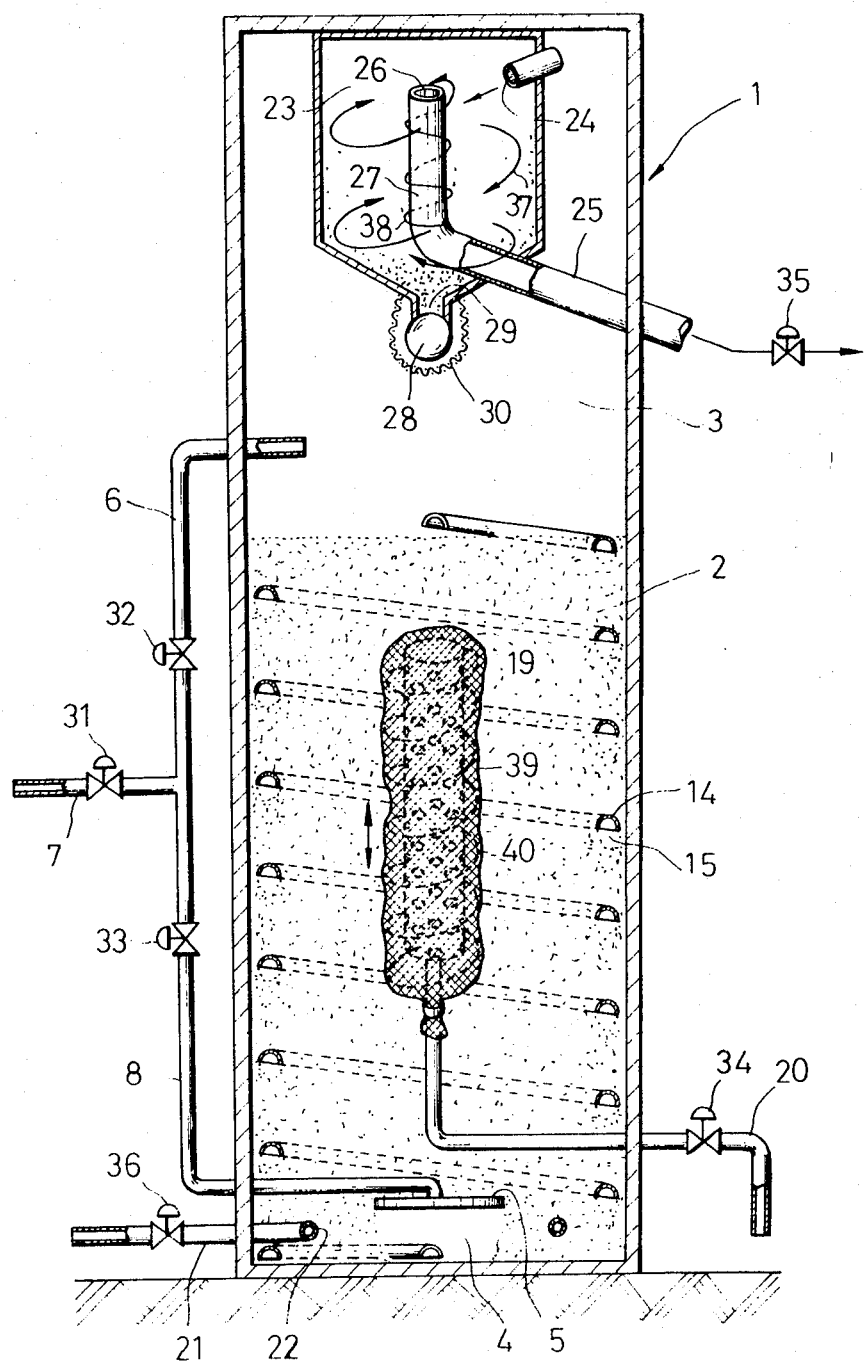
FIG. 4 is a vertical section of a second embodiment of the purification device according to the present invention.

Reference is now made to FIG. 4 which shows a second embodiment of the present invention.

In FIG. 4, parts or portions identical with or equivalent to those shown in FIGS. 1 and 2 are indicated by the same reference numerals and the corresponding description is omitted.

In this embodiment, the raw water distribution pipe 9 has been omitted for simplicity.

Hence, raw water flows into the channel 15 of the channel forming plate 14 only through the upper and lower open ends of the channel forming plate 14.

Secondly, the collector 19 is encircled with a filter net 39. A sliding element 40 in the form of a spirally wound wire is placed between the collector 19 and the filter net 39 for sliding relative to the filter net 39 in order to prevent clogging of the collector 19.

As in the embodiment of FIG. 3, a sliding contact may be caused between the filter medium and the outer surface of the filter net 39 and between the sliding element 40 and the inner surface of the filter net 39 under the effect of movement of the granular filter medium and hence of the layer of the filter medium, resulting in washing of both the inner and outer surfaces of the filter net 39.

Thirdly, the bar 27 in the separation chamber 23 is formed as a hollow cylinder and simultaneously used as washing water discharge tube 25 for simplicity.

The present embodiment is similar in the other respects to the preceding first embodiment.

It is to be noted that the present invention is not limited to the foregoing two embodiments, but may include many modifications. For instance, in the first embodiment, the upper open end of the first raw water supply pipe 6 may be connected to the upper open end of the distribution pipe 9, or a plurality of first raw water supply pipes 6 may be provided for facing into the first raw water chamber 3 with one of such supply pipes 6 connected to the upper open end of the raw water channel forming plate 14.

According to the purification device mentioned above, since the channel forming plate 14 is mounted spirally in the layer 2 of the filter medium on the inner wall of the filter tank 1, and the collector 19 for collecting filtered water is mounted in the layer 2 substantially centrally of the channel forming plate 14, raw water may be filtered from the periphery towards the center of the filter medium 2.

Moreover, since the channel forming plate 14 is mounted spirally and hence the continuous channel 15 is provided in the layer 2 of the filter medium, the number of raw water inlet points into the raw water channel 15 may be less than in the conventional device and occasionally only one such spot will suffice in the extreme case.

Thus, in the first embodiment, the number of such inlet points, such as raw water distribution ports 10 and the number of the accessory elements, that is check valve 11 and distribution plates 12, may be reduced. In the second embodiment, such ports 10 and the accessory parts may be completely eliminated for simplifying the structure and reducing manufacture costs.

These ports 10 and related portions would take up considerable length vertically of the filter layer 2 and it has been a matter of difficulty to provide raw water channel forming plates 14 at intervals less than such length. Since the raw water distribution ports can be reduced in number or omitted in the purification device of the present invention, the channel forming plate 14 can be mounted in the layer 2 at correspondingly reduced intervals, thus resulting in increased area for transverse filtration.

What is claimed is:

1. A water purification device, comprising:
    a filter tank containing a top water chamber and a bottom layer of filter medium;
    a curved plate means, mounted at a periphery of the layer of the filter medium and extended spirally along an inner wall of the filter tank, for defining internally a smoothly continuous channel having an open bottom and a single upper end means, opened into the top water chamber, for receiving raw water;
    a collector means, mounted within the layer of the filter medium and positioned substantially through the center of the plate means, for receiving filtered water from the plate means transversely through the layer of filter medium; and
    filter means, encircling the plate means, for increasing the area of filtration from the smoothly continuous channel for raw water.

2. The water purification device, as recited in claim 1, wherein:
    said curved plate means, has an inverted U-shaped cross-section.

3. The water purification device, as recited in claim 1, further comprising:
    water supply pipe means and air supply pipe means, both mounted in a lower portion of the layer of the filter medium, for countercurrent washing of said layer.

4. The water purification device, as recited in claim 1, further comprising:
    sliding means, placed between the plate means and the filter means, for widening said filter means.

5. The water purification device, as recited in claim 4, wherein:

said sliding means is a plurality of wire pieces.

6. The water purification device, as recited in claim 1, wherein:

said filter means is a net.

7. The water purification device, as recited in claim 1, further comprising:

filter means, encircling the collector means, for preventing clogging of said collector means.

8. A water purification device, comprising:

a filter tank containing a top water chamber and a bottom layer of filter medium;

a curved plate means, mounted at a periphery of the layer of the filter medium and extended spirally along an inner wall of the filter tank, for defining internally a smoothly continuous channel having an open bottom and a single upper end means, opened into the top water chamber, for receiving raw water;

a collector means, mounted within the layer of the filter medium and positioned substantially through the center of the plate means, for receiving filtered water from the plate means transversely through the layer of filter medium;

filter means, encircling the collector means, for preventing clogging of said collector means; and sliding means, placed between the collector means and the filter means, for widening said filter means.

9. The water purification device, as recited in claim 8, wherein:

said filter means is a net.

10. The water purification device, as recited in claim 8, wherein:

said sliding means is a spirally wound wire.

11. A water purification device, comprising:

a filter tank containing a layer of granular filter medium;

a first raw water chamber defined in the filter tank and being in contact with a surface of the filter medium;

a continuous channel forming plate mounted at a periphery of the layer of the filter medium and extending spirally along an inner wall of the filter tank;

an upper end means of the channel forming plate, opened into the first raw water chamber, for allowing raw water to flow into a raw water channel defined under the channel forming plate;

a plurality of raw water distribution means mounted intermediately along the channel forming plate and axially spaced from each other along said channel forming plate, for allowing the raw water to flow into the raw water channel; and a collector means mounted within the layer of the filter medium and positioned substantially through the center of the channel forming plate, for receiving filtered water from the channel forming plate transversely through the layer of the filter medium and from the first raw water chamber vertically through the layer of the filter medium.

12. The water purification device according to claim 11, further comprising:

a second raw water chamber defined in a bottom of the filter tank.

13. The water purification device according to claim 12, further comprising:

a means for washing the filter medium, for disturbing the granular filter medium, and for supplying a washing water.

14. The water purification device according to claim 12, wherein the plurality of raw water distribution means includes at least one distribution port having a check valve.

15. The water purification device according to claim 14, wherein the plurality of raw water distribution means further includes a raw water distribution pipe communicating with the first raw water chamber and the second raw water chamber.

* * * * *